(12) United States Patent
Yoshida

(10) Patent No.: US 11,240,423 B2
(45) Date of Patent: Feb. 1, 2022

(54) DISPLAY CONTROL APPARATUS, METHOD OF CONTROLLING THE SAME, IMAGE CAPTURING APPARATUS, AND STORAGE MEDIUM

(71) Applicant: CANON KABUSHIKI KAISHA, Tokyo (JP)

(72) Inventor: Koji Yoshida, Fujisawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/913,629

(22) Filed: Jun. 26, 2020

(65) Prior Publication Data

US 2020/0412965 A1 Dec. 31, 2020

(30) Foreign Application Priority Data

Jun. 27, 2019 (JP) .............................. JP2019-120200

(51) Int. Cl.
*H04N 5/232* (2006.01)
(52) U.S. Cl.
CPC . *H04N 5/232121* (2018.08); *H04N 5/232127* (2018.08); *H04N 5/232945* (2018.08)

(58) Field of Classification Search
CPC ................... H04N 5/232121; H04N 5/232945
See application file for complete search history.

(56) References Cited

U.S. PATENT DOCUMENTS

| 2013/0194454 A1* | 8/2013 | Alakarhu | H04N 5/23241 |
| | | | 348/239 |
| 2014/0267869 A1* | 9/2014 | Sawa | H04N 5/232122 |
| | | | 348/333.03 |

FOREIGN PATENT DOCUMENTS

JP 2016-197180 A 11/2016

* cited by examiner

*Primary Examiner* — Christopher K Peterson
(74) *Attorney, Agent, or Firm* — Cowan, Liebowitz & Latman, P.C.

(57) ABSTRACT

A display control apparatus comprising a display control unit configured to perform control to display a display item indicating a degree of focus; a first obtainment unit configured to obtain size information of an image to be recorded; a second obtainment unit configured to obtain a defocus amount for a focus detection region; a determination unit configured to determine the degree of focus based on the defocus amount and the size information of the image to be recorded; and a change unit configured to change a display style of the display item based on the degree of focus determined by the determination unit.

16 Claims, 9 Drawing Sheets

FIG. 3A

NON-IMAGING PLANE PHASE DIFFERENCE DETECTION METHOD
PIXEL CONFIGURATION

| R | Gr | R | Gr | R | Gr | R | Gr | R | Gr |
|---|----|---|----|---|----|---|----|---|----|
| Gb | B | Gb | B | Gb | B | Gb | B | Gb | B |

FIG. 3B

IMAGING PLANE PHASE DIFFERENCE DETECTION METHOD
PIXEL CONFIGURATION

| R A | R B | Gr A | Gr B | R A | R B | Gr A | Gr B | R A | R B | Gr A | Gr B | R A | R B | Gr A | Gr B | R A | R B | Gr A | Gr B |
|-----|-----|------|------|-----|-----|------|------|-----|-----|------|------|-----|-----|------|------|-----|-----|------|------|
| Gb A | Gb B | B A | B B | Gb A | Gb B | B A | B B | Gb A | Gb B | B A | B B | Gb A | Gb B | B A | B B | Gb A | Gb B | B A | B B |

FIG. 5B1 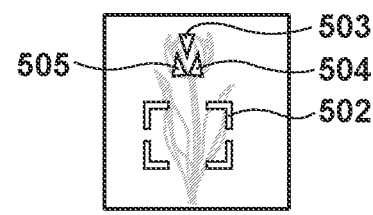
FIG. 5B2 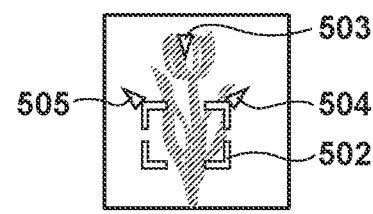
FIG. 5C1 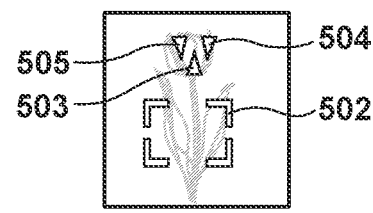
FIG. 5C2 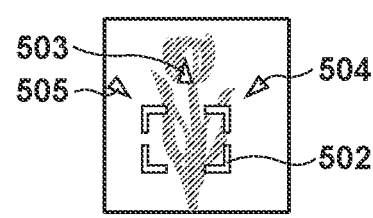

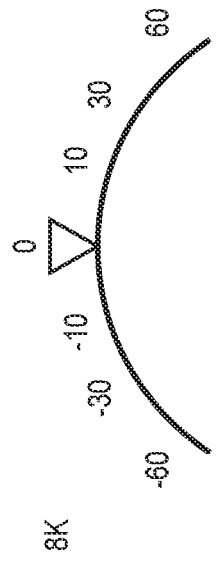
FIG. 8A1
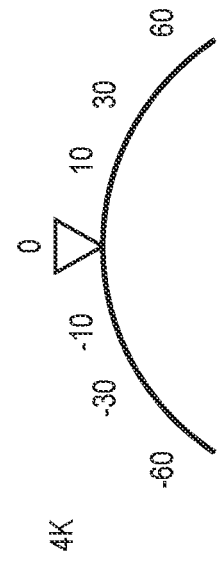
FIG. 8A2
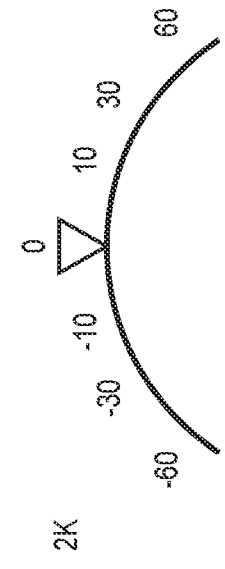
FIG. 8A3
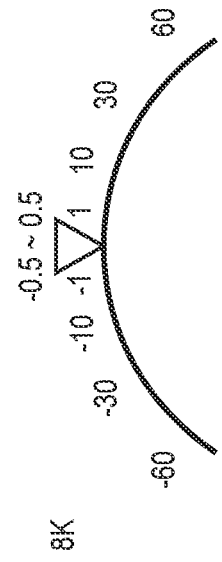
FIG. 8B1
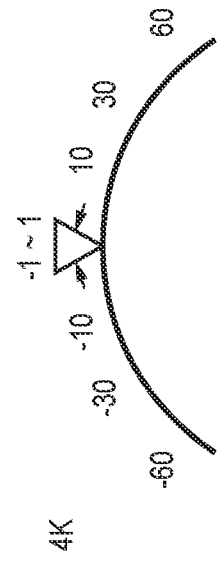
FIG. 8B2
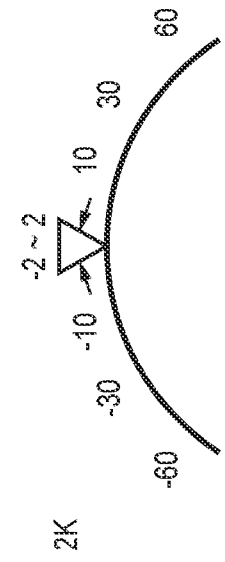
FIG. 8B3

DISPLAY CONTROL APPARATUS, METHOD OF CONTROLLING THE SAME, IMAGE CAPTURING APPARATUS, AND STORAGE MEDIUM

BACKGROUND OF THE INVENTION

Field of the Invention

The present invention relates to a technique for performing display for assisting focusing for a user in a display apparatus.

Description of the Related Art

Conventionally, some image capturing apparatuses are provided with a function for calculating a focus evaluation value of a subject by a focus detection sensor or an image sensor, and displaying, based on the evaluation value, a level of deviation of the focus of the subject to be captured, to assist a user's focusing operation.

Japanese Patent Laid-Open No. 2016-197180 discloses an image capturing apparatus which displays a live view image captured by an image capturing means and displays a display item indicating a degree of focus by superimposing on the live view image.

However, in the conventional technique disclosed in the above-mentioned Japanese Patent Laid-Open No. 2016-197180, focus evaluation values for which in-focus is determined are the same regardless of what image size is to be captured. Therefore, for example, in an image capturing apparatus capable of recording both 8K and 2K image sizes, when focus evaluation values at which to determine in-focus are adjusted to an in-focus accuracy required at 8K, this will mean focusing with an unnecessarily excessive accuracy in the case of 2K. Therefore, focusing becomes unnecessarily difficult.

SUMMARY OF THE INVENTION

The present invention has been made in view of the above-described problems, and provides a display control apparatus capable of assisting the user in focusing with a focus accuracy that matches an image size to be captured.

According to a first aspect of the present invention, there is provided a display control apparatus comprising: at least one memory and at least one processor which function as: a display control unit configured to perform control to display a display item indicating a degree of focus; a first obtainment unit configured to obtain size information of an image to be recorded; a second obtainment unit configured to obtain a defocus amount for a focus detection region; a determination unit configured to determine the degree of focus based on the defocus amount and the size information of the image to be recorded; and a change unit configured to change a display style of the display item based on the degree of focus determined by the determination unit.

According to a second aspect of the present invention, there is provided an image capturing apparatus comprising: an image sensor configured to capture an image of a subject; a display configured to display an image; and a display control apparatus including at least one memory and at least one processor which function as: a display control unit configured to perform control to display a display item indicating a degree of focus; a first obtainment unit configured to obtain size information of an image to be recorded; a second obtainment unit configured to obtain a defocus amount for a focus detection region; a determination unit configured to determine the degree of focus based on the defocus amount and the size information of the image to be recorded; and a change unit configured to change a display style of the display item based on the degree of focus determined by the determination unit.

According to a third aspect of the present invention, there is provided a method of controlling a display control apparatus, the method comprising: performing control to display a display item indicating a degree of focus; obtaining size information of an image to be recorded; obtaining a defocus amount for a focus detection region; determining the degree of focus based on the defocus amount and the size information of the image to be recorded; and changing a display style of the display item based on the determined degree of focus.

Further features of the present invention will become apparent from the following description of exemplary embodiments with reference to the attached drawings.

BRIEF DESCRIPTION OF THE DRAWINGS

FIGS. 3A and 3B are explanatory views of light receiving surfaces of the image capturing element.

FIGS. 5A to 5D are diagrams illustrating examples of displaying focus guides.

FIGS. 8A1 to 8B3 are views showing degree of focus information of a focus guide display for 8K, 4K, and 2K.

DESCRIPTION OF THE EMBODIMENTS

Figure 1:
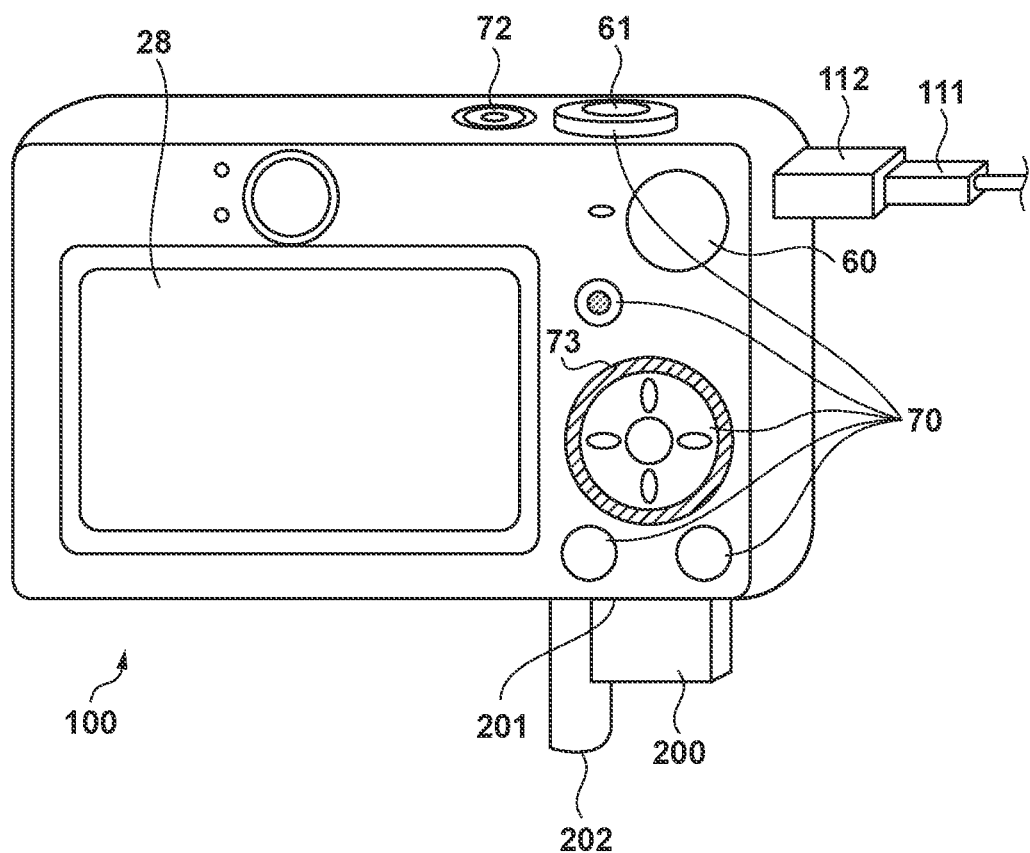
FIG. 1 is an external view of a digital camera according to an embodiment of a display control apparatus according to the present invention.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate.

Furthermore, in the attached drawings, the same reference numerals are given to the same or similar configurations, and redundant description thereof is omitted.

FIG. 1 is an external view of a digital camera according to an embodiment of a display control apparatus according to the present invention.

In FIG. 1, a display unit 28 is a display unit for displaying images and various information. A shutter button 61 is an operation unit for performing a capturing instruction. A mode changeover switch 60 is an operation unit for switching between various modes. A connector 112 is a connector for connecting a digital camera 100 to a connection cable 111 connected to an external apparatus such as a personal computer or a printer. An operation unit 70 is an operation unit that includes operation members such as various switches, buttons, and a touch panel for receiving various operations from a user. A controller wheel 73 is a rotatable operation member included in the operation unit 70. A power switch 72 is a push button for switching the power on and off. A recording medium 200 is a recording medium such as a memory card or a hard disk. A recording medium slot 201 is a slot for storing the recording medium 200. The recording medium 200 can communicate with the digital camera 100 in a state of being stored in the recording medium slot 201, and enables recording or reproduction. A lid 202 is a lid of the recording medium slot 201. FIG. 1 shows a state in which the lid 202 is open and a part of the recording medium 200 has been taken out from the slot 201 and exposed.

Figure 2:
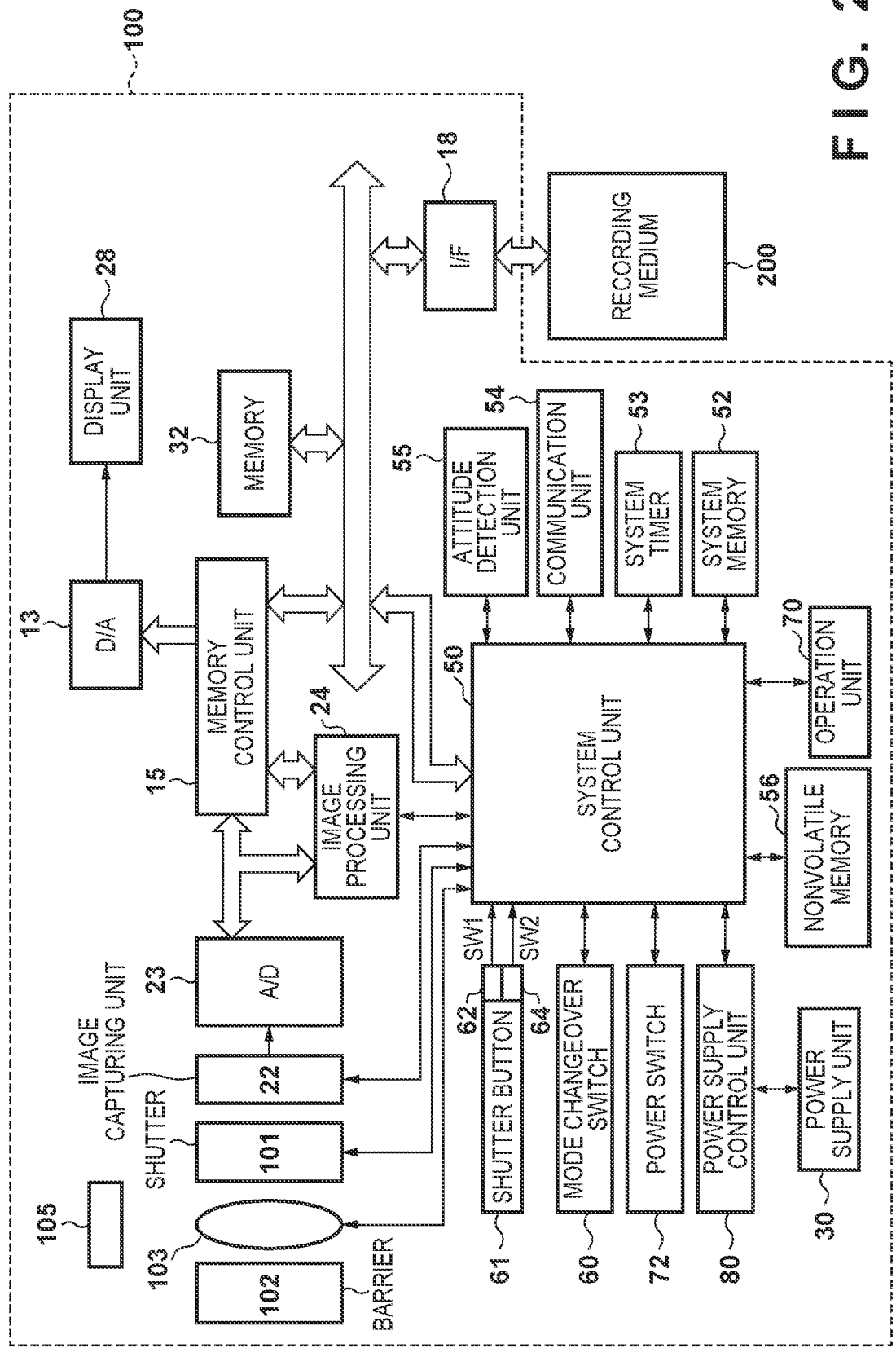
FIG. 2 is a block diagram illustrating an internal configuration of the digital camera.

FIG. 2 is a block diagram illustrating an internal configuration of the digital camera 100.

In FIG. 2, an image capturing lens 103 has a lens group that includes a zoom lens and a focus lens. A shutter 101 is a shutter which is provided with an aperture function. An image capturing unit 22 includes an image capturing element configured by a CCD or a CMOS element or the like for converting an optical image into electric signals. An A/D converter 23 converts an analog image signal outputted from the image capturing unit 22 into a digital signal. A barrier 102 covers the image capturing system that comprises the image capturing lens 103 of the digital camera 100 to thereby prevent contamination of and damage to the image capturing system which includes the image capturing lens 103, the shutter 101, and the image capturing unit 22. Incidentally, the focus lens included in the image capturing lens 103, by the user rotating a focus ring 105, can be moved by a manual operation.

An image processing unit 24 performs resizing processing or color conversion processing such as predetermined pixel interpolation or reduction of data from the A/D converter 23 or data from a memory control unit 15. Further, in the image processing unit 24, predetermined calculation processing is performed using captured image data, and a system control unit 50 performs exposure control, focus detection control based on an obtained calculation result. Thus, AF (auto focus) processing, AE (auto exposure) processing, and EF (pre-flash) processing of a TTL (through the lens) method are performed. The image processing unit 24 further performs predetermined calculation processing using captured image data, and also performs AWB (auto white balance) processing of the TTL method based on an obtained calculation result.

Output data from the A/D converter 23 is directly written into a memory 32 via the image processing unit 24 and the memory control unit 15 or via the memory control unit 15. The memory 32 stores image data that was obtained by the image capturing unit 22 and converted into digital data by the A/D converter 23, and image data to be displayed on the display unit 28. The memory 32 is provided with enough storage capacity to store a predetermined number of still images or a predetermined amount of time of moving images and audio. The memory 32 is also a memory for image display (video memory).

A D/A converter 13 converts data for image display stored in the memory 32 into an analog signal and supplies it to the display unit 28, and the display unit 28 displays the signal. A digital signal that was stored in the memory 32 after first being A/D converted by the A/D converter 23 is converted to analog in the D/A converter 13, and sequentially transferred to the display unit 28 and displayed to thereby realize an electronic viewfinder, and it is possible to perform a through image display (live view display).

A nonvolatile memory 56 is a memory that is an electrically erasable/recordable recording medium, and, for example, a EEPROM or the like is used. The nonvolatile memory 56 stores constants, programs, and the like for the operation of the system control unit 50. Here, the programs are computer programs for executing various flowcharts described later in the present embodiment. The system control unit 50 controls the entire digital camera 100. By executing the programs recorded in the nonvolatile memory 56 described above, each process of the present embodiment will be realized as described later. A RAM is used in the system memory 52. Constants and variables for the operation of the system control unit 50, programs read out from the nonvolatile memory 56, and the like are deployed to the system memory 52. The system control unit 50 also performs display control by controlling the memory 32, the D/A converter 13, the display unit 28 or the like. A system timer 53 is a clock unit for counting an amount of time used for various controls, and the time of an integrated clock.

A mode changeover switch 60, the shutter button 61, and the operation unit 70 are operation means for inputting various operation instructions to the system control unit 50.

The mode changeover switch 60 switches the operation mode of the system control unit 50 between one of a still image recording mode, a moving image capturing mode, a playback mode, or the like. Modes included in the still image recording mode are an auto capturing mode, an auto scene discrimination mode, a manual mode, an aperture priority mode (Av mode), and a shutter speed priority mode (Tv mode). In addition, there are various scene modes, program AE modes, custom modes, and the like, which are image capturing settings for specific image capturing scenes. By the mode changeover switch 60, a switch is made directly to one of these modes. Alternatively, configuration may be such that, after once switching to a list screen of image capturing modes by the mode changeover switch 60, it is possible to select any one of the plurality of displayed modes by another operation member. Similarly, the moving image capturing mode may include a plurality of modes.

A first shutter switch 62 is turned on by a so-called half press (image capturing preparation instruction) in the middle of operation of the shutter button 61 provided in the digital camera 100, and generates a first shutter switch signal SW1. In accordance with the first shutter switch signal SW1, an operation such as AF (auto focus) processing, AE (auto exposure) processing, AWB (auto white balance) processing, and EF (flash pre-flash) processing is started.

A second shutter switch 64 is turned on by a so-called full press (an image capturing instruction) with complete operation of the shutter button 61, and generates a second shutter switch signal SW2. In accordance with the second shutter switch signal SW2, the system control unit 50 starts operation of a series of capturing processing from reading out a signal from the image capturing unit 22 to writing image data to the recording medium 200.

Each operation member of the operation unit 70 is assigned an appropriate function for each scene such as an operation for selecting various function icons displayed on the display unit 28, and acts as various function buttons. The function buttons include, for example, an exit button, a back button, an image advance button, a jump button, a narrowing down button, an attribute change button, and the like. For example, when the menu button is pressed, various settable menu screens are displayed on the display unit 28. A user can intuitively perform various settings by using the menu screen displayed on the display unit 28, four-directional buttons (up, down, left, right) and a SET button.

A controller wheel 73 is a rotatable operation member included in the operation unit 70, and is used when for example instructing a selection item with a direction button.

Upon rotating the controller wheel 73, an electrical pulse signal is generated in accordance with an operation amount, and the system control unit 50 controls respective units of the digital camera 100 based on the pulse signal. By this pulse signal, it is possible to determine how many rotations the controller wheel 73 was rotated, an angle that the controller wheel 73 was rotated, and the like. Incidentally, the controller wheel 73 may be any operation member as long as a rotation operation can be detected.

For example, the controller wheel 73 itself may be a dial operation member for generating a pulse signal is rotated in accordance with a rotation operation by a user. Alternatively, the controller wheel 73 may be such that it does not itself rotate but rather detects a rotation operation or the like of a finger of the user on the controller wheel 73 by a touch sensor operation member (a so-called touch wheel).

A power supply control unit 80 is configured by, for example, a battery detection circuit, a DC-DC converter, and a switch circuit for switching blocks to energize, and the power supply control unit 80 detects whether or not a battery is mounted, the type of the battery, and a remaining battery amount. Further, the power supply control unit 80 controls the DC-DC converter based on result of detection and an instruction from the system control unit 50, and supplies a required voltage for a required period to each unit including the recording medium 200.

A power supply unit 30 is composed of a primary battery such as an alkali battery or a lithium battery, a secondary battery such as a NiCd battery, a NiMH battery, or a Li ion battery, an AC adapter, or the like. A recording medium I/F 18 is an interface with a recording medium 200 such as a memory card or a hard disk. The recording medium 200 is a recording medium such as a memory card for recording a captured image, and is configured by a semiconductor memory, an optical disk, a magnetic disk, or the like.

A communication unit 54 is connected to an external apparatus by a wireless or wired cable, and performs transmission and reception of video signals, audio signals, and the like. The communication unit 54 can also be connected to a wireless LAN (Local Area Network) or the Internet. The communication unit 54 can transmit an image captured by the image capturing unit 22 (including a through image) and an image recorded on the recording medium 200, and can receive image data and other various information from an external apparatus.

An attitude detection unit 55 detects the attitude of the digital camera 100 with respect to the gravity direction. Based on the attitude detected by the attitude detection unit 55, it is possible to discriminate whether an image captured by the image capturing unit 22 is an image that was captured with the digital camera 100 held horizontally or an image that was captured with the digital camera 100 held vertically. The system control unit 50 can, for example, add orientation information corresponding to the attitude detected by the attitude detection unit 55 to an image file of the image captured by the image capturing unit 22, and can record after rotating the image. As the attitude detection unit 55, it is possible to use an acceleration sensor, a gyro sensor, or the like.

FIGS. 3A and 3B are diagrams showing a part of the light receiving surface of the image capturing element as an image sensor provided by the image capturing unit 22.

In order to enable imaging plane phase difference AF, the image capturing element is arranged in an array of pixel portions holding two photodiodes which are light receiving units as photoelectric conversion means with respect to one microlens. Thus, at each pixel portion, it is possible to receive a light beam obtained by dividing the exit pupil of the image capturing lens 103.

FIG. 3A is a schematic view of a portion of the image sensor surface which has an example of a Bayer array of red (R), blue (B), green (Gb, Gr), as a reference. FIG. 3B is an example of pixel portions in which two photodiodes as photoelectric conversion means are held with respect to one microlens in accordance with the arrangement of the color filters in FIG. 3A.

An image sensor having such a configuration can output two signals for phase difference detection from each pixel portion (hereinafter also referred to as an A image signal and a B image signal). Further, it is possible to output a signal for recording that is obtained by adding the signals of the two photodiodes (A image signal+B image signal). In the case of this summed signal, a signal equivalent to the output of the image sensor of the Bayer array example described in FIG. 3A is output.

Using the output signal from the image capturing element as such an image sensor, the system control unit 50 performs a correlation operation of the two image signals, and calculates information such as a defocus amount and various reliabilities. For the defocus amount, a defocus amount at the image surface is calculated based on the deviation between the A image signal and the B image signal. The defocus amount has a positive or negative value, and whether there is front focus or rear focus is known depending on whether the defocus amount is a positive value or a negative value. Further, by the absolute value of the defocus amount, the degree of focus can be understood, if a defocus amount of 0 is in-focus. That is, the system control unit 50 determines whether there is front focus or rear focus based on whether the defocus amount calculated for a distance measuring position (distance measuring region, focus detection position, focus detection region) is positive/negative. In addition, degree of focus information, which is the degree of focus (the degree of focus deviation), is detected based on the absolute value of the defocus amount. Information on front focus or rear focus is outputted when the defocus amount exceeds a predetermined value, and information on in-focus is outputted when the absolute value of the defocus amount is less than or equal to the predetermined value. Incidentally, the degree of focus information is outputted as a value resulting from converting the defocus amount into an operation amount to rotate the focus ring 105 until being in-focus is achieved.

Incidentally, in the present embodiment, a total of three signals are outputted from the image capturing element 102: the signal for capturing and the two signals for phase difference detection. In this respect, there is no limitation to such a method. For example, configuration may be taken to output a total of two signals: the signal for capturing and one of the two image signals for phase difference AF. In this case, after output, the other signal of the two image signals for phase difference detection is calculated using the two output signals from the image capturing element 102.

Further, in FIG. 3B, an example in which pixel portions each holding two photodiodes as photoelectric conversion means for one microlens are arranged in an array is shown. Further, configuration may be taken such that pixel portions each holding three photodiodes as photoelectric conversion means for one microlens are arranged in an array. Further, configuration may be taken such that an opening position of the light receiving unit with respect to the microlens has a plurality of different pixel portions. That is, it is sufficient if ultimately it is possible to obtain two signals—the A image signal and the B image signal—for phase difference detection by which a phase difference can be detected.

Figure 4:
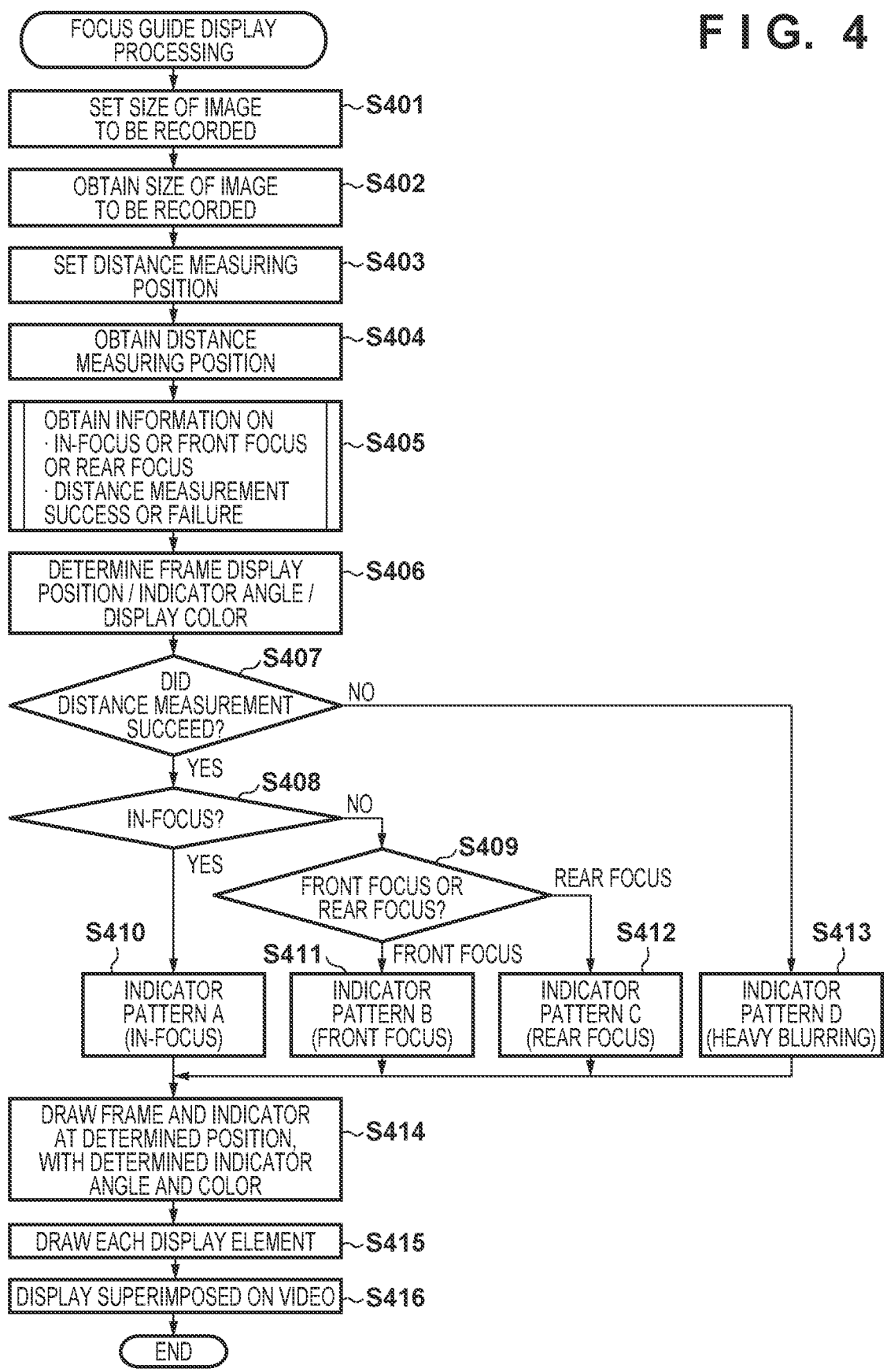
FIG. 4 is a flowchart illustrating a focus guide display operation procedure.

FIG. 4 is a flowchart showing a focus guide display operation procedure in the present embodiment.

A focus guide display is a display that shows a degree of focus. By viewing this display, in-focus, front focus, and rear focus can be understood at a glance, and a user can perform smooth and precise focusing even by a manual operation such as turning the focus ring 105 of the image capturing lens 103.

In step S401, the system control unit 50 records a size of an image to be recorded which is set in the memory 32 by a user using the operation unit 70. The image referred to herein is a still image or a moving image. The size is a recording size of an image or a crop size (function of cutting out a part of a screen). The digital camera 100 of the present embodiment is capable of capturing an image of 2K, 4K, 8K sizes (resolution), and further capable of outputting an image resulting from cropping an image of each of these sizes. Numbers of pixels of respective image sizes are 2K (full HD): 1920×1080, 4K (DCI): 4096×2160, 4K (UHD): 3840×2160, 8K (DCI): 8192×4320, and 8K (UHD): 7680×4320.

In step S402, the system control unit 50 obtains the size of the image to be recorded which was set in the memory 32 in step S401.

In step S403, the system control unit 50 records a distance measuring position (a focus detection position) which is set in the memory 32 by a user using the operation unit 70.

In step S404, the system control unit 50 obtains the distance measuring position which was set in the memory 32 in step S403.

In step S405, the image processing unit 24 performs predetermined calculation processing using the captured image data, and outputs a calculation result. Detail of processing in step S405 will be described later using a flowchart, but an outline of the processing of step S405 will be described below.

The system control unit 50, based on the calculation result outputted by the image processing unit 24, performs a correlation operation of the two image signals: the A image signal and the B image signal described in FIG. 3, and calculates information such as a defocus amount and various reliabilities. For the defocus amount, a defocus amount at the image surface is calculated based on the deviation between the A image signal and the B image signal. The defocus amount has a positive or negative value, and whether there is front focus or rear focus is known depending on whether the defocus amount is a positive value or a negative value. Further, by the absolute value of the defocus amount, the degree of defocus can be understood, and if the defocus amount is 0, the image is in-focus.

That is, the system control unit 50 outputs to the memory 32 or the like information on whether there is front focus or rear focus based on positive/negative for the defocus amount calculated for a distance measuring position (distance measuring region, focus detection position, focus detection region). In addition, based on the absolute value of the defocus amount, the degree of focus information, which is a degree of focus (the degree of focus deviation), is outputted to the memory 32 or the like. Information on front focus or rear focus is outputted when the defocus amount exceeds a predetermined value, and information on in-focus is outputted when the absolute value of the defocus amount is less than or equal to the predetermined value. Incidentally, the degree of focus information is outputted as a value resulting from converting the defocus amount into an operation amount to rotate the focus ring 105 until being in-focus is achieved. The predetermined value determined to be in focus varies depending on the type, aperture value, and focal length of the image capturing lens 103, and the size of the image to be recorded obtained in step S402.

Here, the size of the image to be recorded means the number of pixels and of the image to be recorded or a crop size, as already described above. The predetermined value for comparing a defocus amount determined to be in-focus varies depending on the number of pixels of the image to be recorded because the required focusing accuracy varies depending on the number of pixels of the image to be recorded. The greater the number of pixels of the image to be recorded, the higher the required focus accuracy, and the smaller the predetermined value for which being in focus is determined. For example, in the case of 8K and 2K moving images, the focus accuracy required by 8K is higher, and a predetermined value at which being in-focus is determined is ¼ that of 2K. Also, in the case of 4K, a predetermined value at which being in-focus is determined is similarly ½ that in the case of 2K. In addition, in the case of an L size and an S size for still images, the L size which is larger has a higher required focus accuracy and a smaller predetermined value for which being in-focus is determined.

In contrast, with respect to the crop size of an image to be recorded, in the case of having the same number of pixels for images to be recorded, the smaller the crop region, the smaller the pixel pitch with respect to the image capturing element, the higher the required focus accuracy, and the smaller the predetermined value at which in-focus is determined.

In step S406, the system control unit 50, based on the information obtained in step S404 and step S405, determines a frame display position, an indicator angle, and a display color for a focus guide (assist display, focus guide, focus guide display) to be drawn on the display unit 28. The frame display position is determined to be the distance measuring position. The indicator angle is determined on the basis of information as to whether an in-focus, front focus, or rear focus state has been entered, and the degree of focus information in the case of front focus or rear focus. The display color is determined on the basis of the information of which the in-focus, front focus, or rear focus states has been entered, and the information of distance measurement success or failure. Details will be described later.

In step S407, the system control unit 50 refers to the information of distance measurement success or failure obtained in step S405, and determines whether the distance measurement is successful or not. If successful, the processing advances to step S408; if unsuccessful, the processing advances to step S413.

In step S408, the system control unit 50 determines whether the subject is in an in-focus state or in an out-of-focus state based on the information obtained in step S405. If the in-focus state has been entered, the process proceeds to step S410, and if it is in the out-of-focus state, the process proceeds to step S409.

In step S409, the system control unit 50 determines whether the subject is in a front focus state or a rear focus state based on the information obtained in step S405. If the subject is in the front focus state, the process proceeds to step S411, and if it is in the rear focus state, the process proceeds to step S412.

Figure 5A:
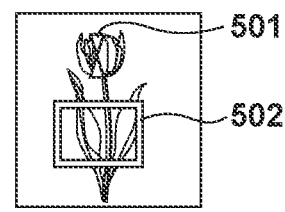

In step S410, the system control unit 50 selects the indicator pattern A, i.e. the data of the focus guide corresponding to an indicator display style for a case where the subject is in an in-focus state. Examples of displaying data for the indicator and the frame are shown in FIG. 5A. An indicator 501 indicates an in-focus state (a state in which the subject in the focus detection region is in focus), and an indicator 504 and an indicator 505, which will be described later, overlap with each other and have merged, and are at a position adjacent to (aligned with) the indicator 503 (in-focus position) (are at a position indicated by the indicator 503). Display is made in green which is different from the color of other states. With such a representation, since the display area of the indicator is smaller in comparison with other states in the in-focus state or the vicinity thereof, it is possible to reduce the influence on visibility of the image for the photographer. A frame 502 shows a region corresponding to the distance measuring position obtained in step S404 on the live view screen.

In step S411, the system control unit 50 selects the indicator pattern B, i.e. the data of the focus guide corresponding to an indicator display style for a case where the subject is in a front focus state. Examples of displaying data for the indicator and the frame are shown in FIG. 5B1 and FIG. 5B2. The indicator 503 indicates a target point of the indicator 504 and the indicator 505 for heading to the in-focus state, and is represented by a white triangle directed toward the frame 502. The indicator 504 and the indicator 505, by the display distance therebetween, show the degree of focus of the distance measuring position, and are represented by triangles facing away from the frame 502. When the distance between the subject and the digital camera 100 changes, since the degree of focus changes, spacing between the indicator 504 and the indicator 505 is narrowed or widened and the display position is changed dynamically. Based on the degree of focus information, the distance (angle) between the indicator 504 and the indicator 505 changes so that, in the focus detection region, the display distance is smaller (narrower, the angle is smaller) when the deviation from in-focus is smaller in comparison to a case where the deviation from in-focus is large. Namely, FIG. 5B1 shows a case where the subject has relatively low blurring (the degree of focus deviation is small) and FIG. 5B2 shows the case where the subject has relatively high blurring (the degree of focus deviation is large).

By the indicator 503, the indicator 504 and the indicator 505 forming a triangle where vertices face each other in the vicinity of in-focus, subtle focus shift in the vicinity of in-focus is also easily visible. Further, since each indicator is displayed in the vicinity of the frame 502, the photographer can confirm the in-focus state without greatly averting their line of sight from the subject. In addition, even in a case where it is possible for focus guide displays to be simultaneously displayed at a plurality of positions, the connection between each frame and the indicators becomes easy to understand.

In step S412, the system control unit 50 selects the indicator pattern C, i.e. the data of the focus guide corresponding to an indicator display style for a case where the subject is in a rear focus state. Examples of displaying data for the indicator and the frame are shown in FIG. 5C1 and FIG. 5C2. Unlike FIG. 5B1 and FIG. 5B2, the indicator 503 is represented by a white triangle facing away from the frame 502, and the indicator 504 and the indicator 505 are represented by triangles facing toward the frame 502. Therefore, the display style is such that it is possible to distinguish between front focus and rear focus at a glance. Namely, FIG. 5C1 shows a case where the subject has relatively low blurring (the degree of focus deviation is small) and FIG. 5C2 shows the case where the subject has relatively high blurring (the degree of focus deviation is large).

Regarding the focus guide display of the subject in the front focus or rear focus state, when the sizes of images to be recorded are different, at the same defocus amount, the angle of the triangles for the indicator 504 and the indicator 505 are the same, but the display distance between the indicator 504 and the indicator 505 is different. For example, in the case of moving images, if 8K and 2K, the focus accuracy required by 8K is higher and the display distance is wider.

The focus guide display for where the subject is in the front focus or rear focus state is not limited to the above, and configuration may be taken that, for the same defocus amount, the triangle angles of the indicator 504 and the indicator 505 are different, but the display distance between the indicator 504 and the indicator 505 are the same.

Figure 5D:
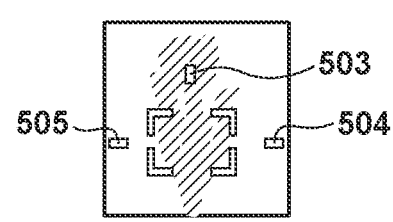

In step S413, the system control unit 50 selects the indicator pattern D, i.e. the data of the focus guide corresponding to an indicator display style for a case where the subject is in a heavy blurring state. Examples of displaying data for the indicator and the frame are shown in FIG. 5D. The indicators 503, 504, and 505 are all represented by a rectangle, and differ in shape from the indicators shown in FIG. 5A, FIG. 5B1, FIG. 5B2, FIG. 5C1, and FIG. 5C2. The color is also displayed in gray. By this, it is visually indicated that a state of heavy blurring in which the determination of front focus or rear focus failed (i.e., the distance measurement failed) has been entered.

In step S414, the system control unit 50 draws the data of the indicator and the frame selected in any of step S410 to step S413 on the OSD display VRAM using the display position, the indicator angles, and the display colors determined in step S406.

In step S415, the system control unit 50 draws various display elements other than the focus guide display on the OSD display VRAM.

Figure 6A:
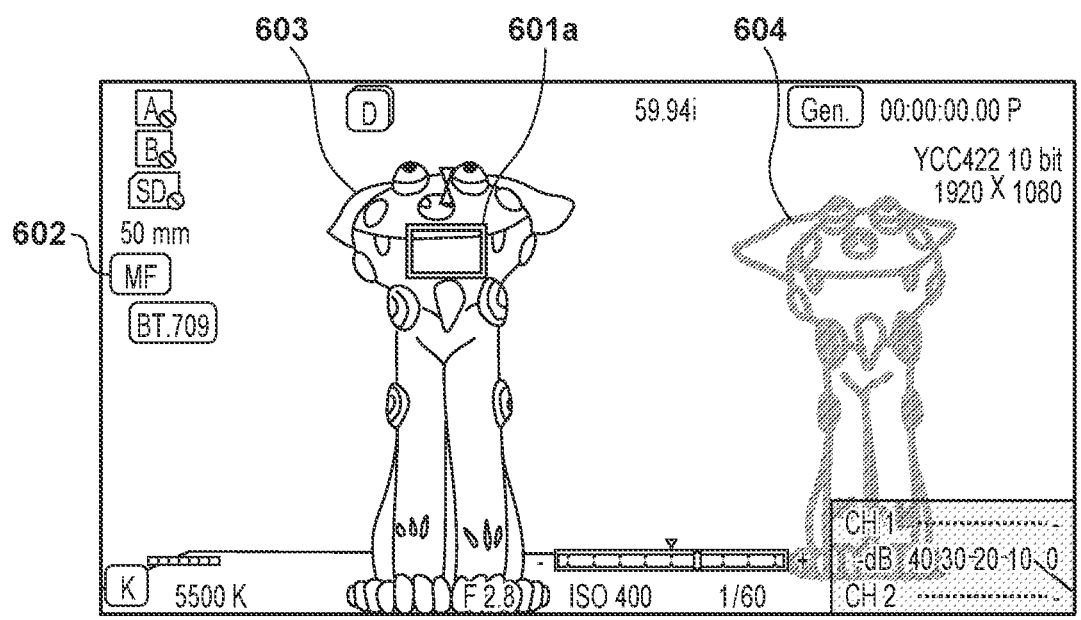
FIGS. 6A and 6B are diagrams illustrating examples of screen displays during display of focus guides.
Figure 6B:
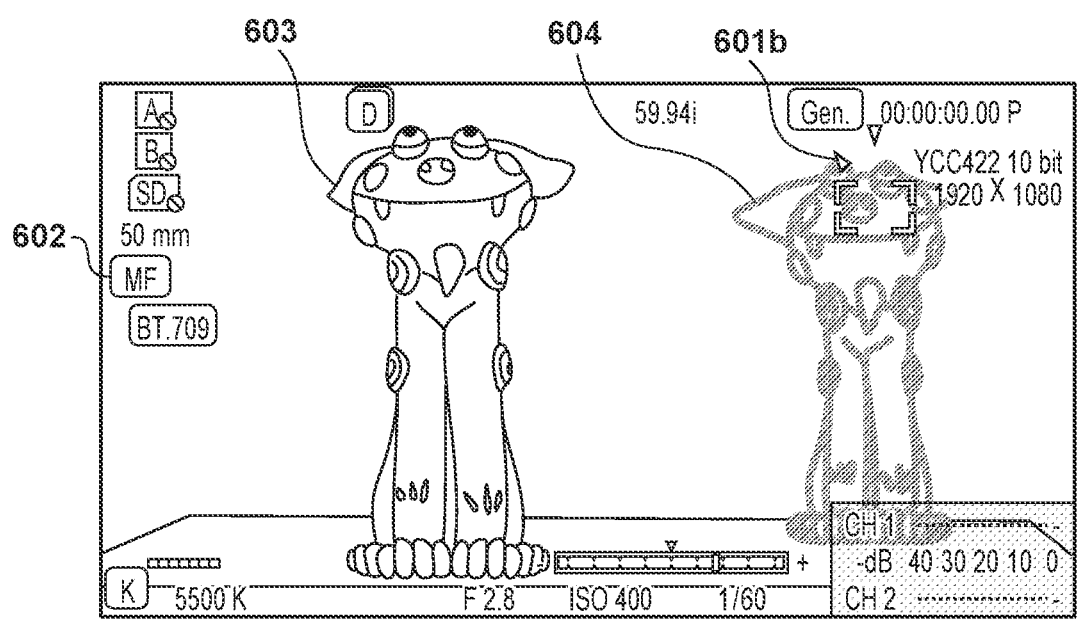

In step S416, the system control unit 50 superimposes the data of the OSD display VRAM drawn in step S414 and step S415 on the video (live view image) and displays the result on the display unit 28. Screen configurations displayed on the display unit 28 in such a case are shown in FIG. 6A and FIG. 6B. Each of a focus guide 601a and a focus guide 601b is configured by a frame and indicators shown in any of FIGS. 5A to 5D. An icon 602 indicates that MF (manual focus) is set. A subject 603 and a subject 604 are subjects (part of the live view) formed on the image capturing unit 22. Other information display elements which have little relation to the present embodiment are also displayed on the screen. These are drawn in step S415, but reference numerals are not added thereto. In FIG. 6A, the distance measuring position obtained in step S404 corresponds to the subject 603, and the subject 603 is in an in-focus state. In contrast, FIG. 6B shows a display example in a case of having moved the distance measuring position from the position in FIG. 6A by the operation unit 70. The distance measuring position is a position of the subject 604, and is in a front focus state with respect to the subject 604.

Figure 7A:
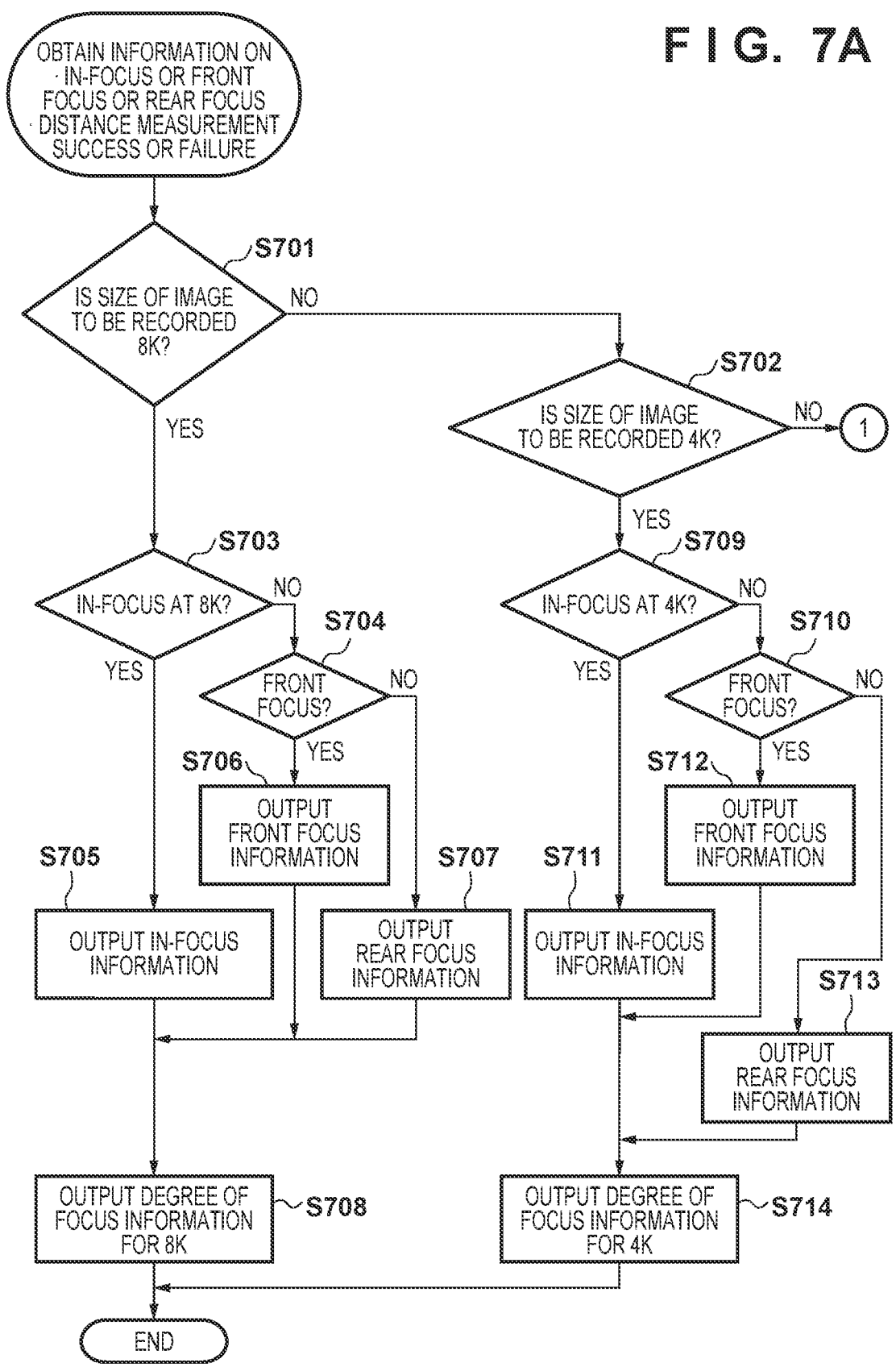
FIGS. 7A and 7B are flowcharts illustrating an operation procedure for obtaining information on in-focus, front focus, and rear focus.
Figure 7B:
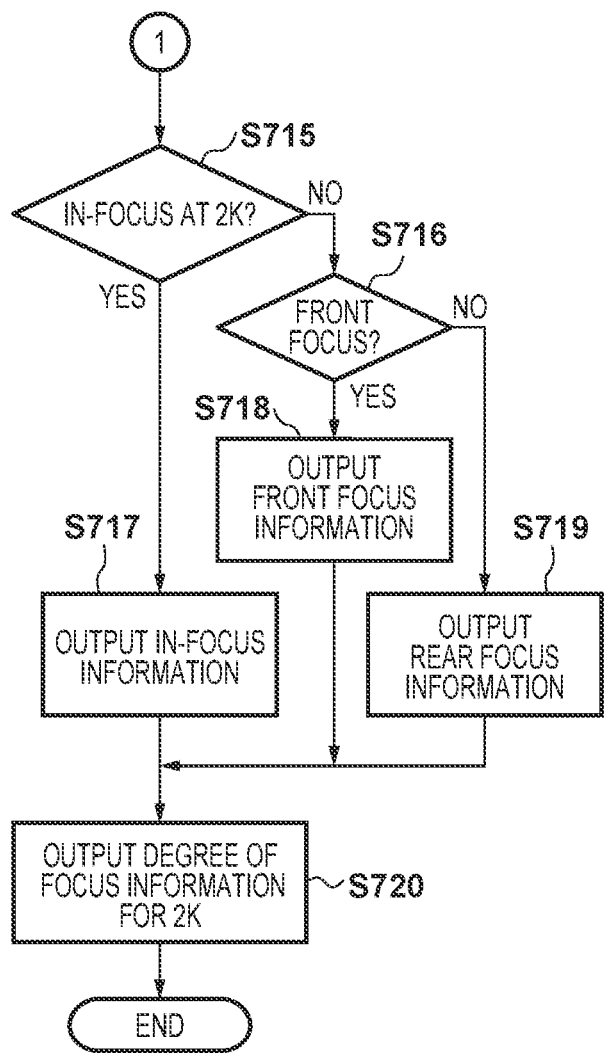

Next, FIGS. 7A and 7B are flowcharts illustrating detailed operation in step S405 of FIG. 4, illustrating a procedure for operations to obtain information of in-focus, front focus and rear focus, and information on successful or failure of distance measurement.

In step S701, the system control unit 50 determines whether the size of the image to be recorded obtained in step S401 is 8K. If the size is 8K, the processing advances to step S703; if the size is not 8K, the processing advances to step S702.

In step S702, the system control unit 50 determines whether the size of the image to be recorded obtained in step S401 is 4K. If the size is 4K, the processing advances to step S709; if the size is not 4K, the processing advances to step S715.

In the present embodiment, since the options of the image to be recorded are three types: 8K, 4K, and 2K, it is determined that the image to be recorded is not 8K or 4K but 2K. Of course, an image to be recorded other than 8K, 4K, and 2K can be selected as an option for the image to be recorded.

In step S703, the system control unit 50 determines whether or not there is in-focus when the image to be recorded is 8K. If there is in-focus, the processing proceeds to step S705; if there is no in-focus, the processing proceeds to step S704. When the calculated absolute value of the defocus amount is less than or equal to the in-focus determination value for 8K, it is determined that there is in-focus. Since higher focus accuracy is required for 8K than for 4K and 2K, the in-focus determination value is smaller than that for 4K and 2K.

In step S704, the system control unit 50 determines whether or not there is front focus. If there is front focus, the processing proceeds to step S706; if there is no front focus, the processing proceeds to step S707.

In step S705, the system control unit 50 outputs information on being in focus. In step S706, the system control unit 50 outputs information that there is front focus. In step S707, the system control unit 50 outputs information that there is rear focus.

In step S708, the system control unit 50 outputs degree of focus information for 8K. This was described in step S405, but the degree of focus information is outputted as a value resulting from converting the defocus amount into an operation amount to rotate the focus ring 105 until being in-focus is achieved.

Using FIGS. 8A1 to 8B3, description is given regarding examples of degree of focus information for focus guide displays with 8K, 4K, and 2K. In FIGS. 8A1 to 8A3, the degree of focus information for which in-focus is determined differs depending on the size of the image to be recorded, and the range of degree of focus information for which out-of-focus is determined also differs depending on the size of the image to be recorded.

In the present embodiment, if the degree of focus information for which in-focus is determined in 8K is −0.5 to 0.5, the indicator angles are 0 degrees when the degree of focus information is −0.5 to 0.5. When the absolute value of the degree of focus information exceeds 0.5, the indicator angle is determined in step S406 based on the degree of focus information. In addition, if the degree of focus information for which in-focus is determined in 4K is −1.0 to 1.0, the indicator angles are 0 degrees when the degree of focus information is −1.0 to 1.0. When the absolute value of the degree of focus information exceeds 1.0, the indicator angle is determined in step S406 based on the degree of focus information. In addition, if the degree of focus information for which in-focus is determined in 2K is −2.0 to 2.0, the indicator angles are 0 degrees when the degree of focus information is −2.0 to 2.0, and when the absolute value of the degree of focus information exceeds 2.0, the indicator angle is determined in step S406 based on the degree of focus information.

In contrast, FIG. 8B1 to FIG. 8B3 are examples of a case where the degree of focus information for which in-focus is determined is 0 regardless of the size of the image to be recorded, and the range of degree of focus information for which out-of-focus is determined are the same regardless of the size of the image to be recorded. In this case, although the defocus amount for which in-focus is determined differs depending on the size of the image to be recorded, the degree of focus information for which in-focus is determined is the same 0. Therefore, although the range of the defocus amount for which out-of-focus is determined also differs depending on the size of the image to be recorded, the range of the degree of focus information for which out-of-focus is determined is the same regardless of the size of the image to be recorded.

Returning to the description of FIG. 7A, in step S709, the system control unit 50 determines whether or not there is in-focus when the image to be recorded is 4K. If there is in-focus, the processing proceeds to step S711; if there is no in-focus, the processing proceeds to step S710. When the calculated absolute value of the defocus amount is less than or equal to the in-focus determination value for 4K, it is determined that there is in-focus.

In step S710, the system control unit 50 determines whether or not there is front focus. If there is front focus, the processing proceeds to step S712; if there is no front focus, the processing proceeds to step S713.

In step S711, the system control unit 50 outputs information on being in focus. In step S712, the system control unit 50 outputs information that there is front focus. In step S713, the system control unit 50 outputs information that there is rear focus.

In step S714, the system control unit 50 outputs degree of focus information for 4K. The detailed explanation is as described above in step S708.

In step S715, the system control unit 50 determines whether or not there is in-focus when the image to be recorded is 2K. If there is in-focus, the processing proceeds to step S717; if there is not in-focus, the processing proceeds to step S716. When the calculated absolute value of the defocus amount is less than or equal to the in-focus determination value for 2K, it is determined that there is in-focus.

In step S716, the system control unit 50 determines whether or not there is front focus. If there is front focus, the processing proceeds to step S718; if there is no front focus, the processing proceeds to step S719.

In step S717, the system control unit 50 outputs information on being in focus. In step S718, the system control unit 50 outputs information that there is front focus. In step S719, the system control unit 50 outputs information that there is rear focus. In step S720, the system control unit 50 outputs degree of focus information for 2K. The detailed explanation is as described above in step S708.

The determination result of FIGS. 7A and 7B above is used in the process of step S407 to step S413 of FIG. 4 which are described above.

As described above, according to the above embodiment, by changing the focus evaluation value at which in-focus is determined in accordance with the size of the image to be recorded, it is possible for a user to focus with in-focus accuracy that is in accordance with the size of the image to be recorded.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-120200, filed Jun. 27, 2019 which is hereby incorporated by reference herein in its entirety.

What is claimed is:

1. A display control apparatus comprising:
   at least one memory and at least one processor which function as:
   a display control unit configured to perform control to display a display item indicating a degree of focus;
   a first obtainment unit configured to obtain size information of an image to be recorded;
   a second obtainment unit configured to obtain a defocus amount for a focus detection region;
   a determination unit configured to determine the degree of focus based on the defocus amount and based on the size information of the image to be recorded; and
   a change unit configured to change a display style of the display item based on the degree of focus determined by the determination unit.

2. The display control apparatus according to claim 1, wherein the display control unit displays the display item indicating the degree of focus superimposed on a live view image captured by an image sensor.

3. The display control apparatus according to claim 1, wherein the determination unit determines that, in a case where the defocus amount is the same, the degree of focus is higher for a case where the size of the image to be recorded is smaller than for a case where the size of the image to be recorded is larger.

4. The display control apparatus according to claim 3, wherein the display item has at least two indicators, and is configured to represent the degree of focus by a distance between the two indicators, and wherein the change unit changes the distance between the two indicators based on the degree of focus in a case where the defocus amount is the same.

5. The display control apparatus according to claim 4, wherein the change unit changes the distance between the two indicators to be smaller for a case where the degree of focus is higher than for a case where the degree of focus is lower.

6. The display control apparatus according to claim 3, wherein the display item has at least two indicators, and is configured to represent the degree of focus by a tilt angle between the two indicators, and wherein the change unit changes the tilt angle between the two indicators based on the degree of focus in a case where the defocus amount is the same.

7. The display control apparatus according to claim 6, wherein the change unit changes the tilt angle between the two indicators to be smaller for a case where the degree of focus is higher than for a case where the degree of focus is lower.

8. The display control apparatus according to claim 1, wherein the size information of the image to be recorded is a resolution of a still image.

9. The display control apparatus according to claim 1, wherein the size information of the image to be recorded is a resolution of a moving image.

10. The display control apparatus according to claim 1, wherein the size information of the image to be recorded is a crop size of a still image.

11. The display control apparatus according to claim 1, wherein the size information of the image to be recorded is a crop size of a moving image.

12. The display control apparatus according to claim 1, wherein the display item includes a plurality of indicators indicating a degree of focus for the focus detection region, the plurality of indicators have at least a first indicator and a second indicator indicating a degree of focus according to a relationship of display positions with each other, and a third indicator indicating an in-focus position, and wherein the first indicator and the second indicator are merged and align with a position indicated by the third indicator, thereby indicating that a subject of the focus detection region is in focus.

13. The display control apparatus according to claim 1, wherein
   the determination unit determines whether a subject of the focus detection region is in an in-focus state or in an out-of-focus state; and
   a range of degree of focus information for which the out-of-focus state is determined varies in accordance with the size information of the image to be recorded.

14. An image capturing apparatus comprising:
   an image sensor configured to capture an image of a subject;
   a display configured to display an image; and
   a display control apparatus including at least one memory and at least one processor which function as:
   a display control unit configured to perform control to display a display item indicating a degree of focus;
   a first obtainment unit configured to obtain size information of an image to be recorded;
   a second obtainment unit configured to obtain a defocus amount for a focus detection region;
   a determination unit configured to determine the degree of focus based on the defocus amount and based on the size information of the image to be recorded; and
   a change unit configured to change a display style of the display item based on the degree of focus determined by the determination unit.

15. A method of controlling a display control apparatus, the method comprising:

performing control to display a display item indicating a degree of focus;
obtaining size information of an image to be recorded;
obtaining a defocus amount for a focus detection region;
determining the degree of focus based on the defocus amount and based on the size information of the image to be recorded; and
changing a display style of the display item based on the determined degree of focus.

16. A non-transitory computer-readable storage medium that stores programs for causing a computer to function as each unit of a display control apparatus, the display control apparatus comprising:
at least one memory and at least one processor which function as:
a display control unit configured to perform control to display a display item indicating a degree of focus;
a first obtainment unit configured to obtain size information of an image to be recorded;
a second obtainment unit configured to obtain a defocus amount for a focus detection region;
a determination unit configured to determine the degree of focus based on the defocus amount and based on the size information of the image to be recorded; and
a change unit configured to change a display style of the display item based on the degree of focus determined by the determination unit.

* * * * *